Dec. 16, 1941.   E. L. FISCHER   2,266,419
CAMERA CONSTRUCTION
Filed June 22, 1940

EDWIN L. FISCHER
INVENTOR.

BY Philip E. Hopkins
William C. Babcock
ATTORNEYS

Patented Dec. 16, 1941

2,266,419

UNITED STATES PATENT OFFICE 2,266,419

CAMERA CONSTRUCTION

Edwin L. Fischer, Endwell, N. Y., assignor to General Aniline & Film Corporation, Binghamton, N. Y., a corporation of Delaware Application June 22, 1940, Serial No. 341,787

5 Claims. (Cl. 95—53)

My invention relates to an actuating device for camera shutters.

It is well known that among the important objectives desired and striven for by the manufacturers of cameras is a unit that is compact, efficient and fool-proof. The invention as hereinafter described is submitted as a material contribution toward the production of a unit embodying such features as well as toward simplification in the construction of the same.

In the conventional camera it has heretofore been the practice to attach the flexible cable and dependent mechanism for actuating the camera shutter, near the top or on the side of the shutter casing. In operation, due to its position with respect to the lens, this arrangement necessitated the use of caution on the part of the operator to avoid accidentally moving his thumb or fingers into alignment with the lens and the object to be photographed. It also quite frequently occurs in the use of the conventional arrangement that the operator, while watching the subject through the finder and at the same time trying to pick up the flexible cable, accidentally brushes the light or speed adjustments carried by the lens and shutter casings thereby throwing the same out of adjustment.

The invention hereinafter described and claimed will tend to lessen the number of exposures that are spoiled due to the above faults.

Figure 1:
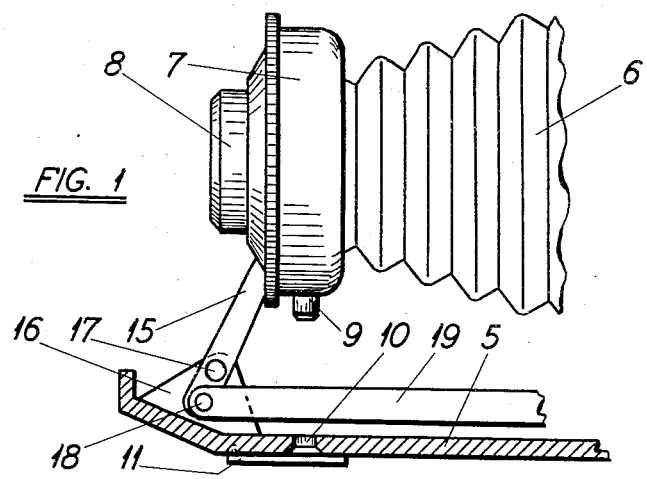
Figure 2:
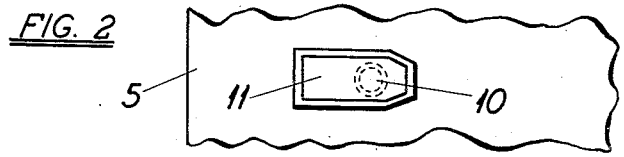
Figure 3:
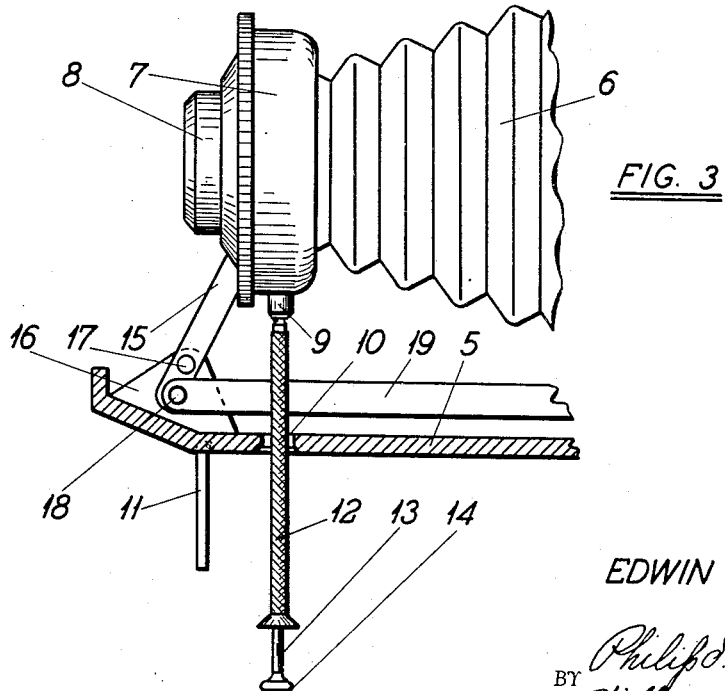

In the drawing, forming a part of this specification, and in which like numerals are employed to designate like parts throughout the same, Figure 1 illustrates a plan view of a portion of a folding camera to which one form of my invention is applied, the camera bed being shown in section, Figure 2 is a bottom view of a portion of the platform shown in Figure 1, and Figure 3 is an enlarged side view of the camera illustrated in Figure 1, showing my invention applied thereto.

In the drawing wherein for the purpose of illustration is shown a preferred embodiment of my invention, the numeral 5 designates a hinged platform or bed of a folding camera having a bellows 6, shutter casing 7 and lens 8. The shutter casing and lens are carried above the bed by one or more supporting links 15 pivoted to bed brackets 16 at points 17. Pivoted to links 15 at points 18 are the usual erecting links 19 the other ends of which are pivoted to the camera body or to the bed braces to constitute a self erecting front mechanism of well known structure. In the drawing, one set of links is omitted for clarity.

At the bottom of the shutter casing 7, I have provided a threaded socket 9, which socket, when the camera is in its unfolded or open position, is in alignment with an aperture 10, provided in the platform 5. The aperture 10 is positioned beneath the hinged leg 11, which leg acts as a support for the front of the camera when resting upon a flat surface. When the hinged leg is closed or folded against the platform as shown in Figures 1 and 2 it acts as a cover for the aperture 10.

A shutter release member, for example a flexible cable comprising a housing 12 and core 13, is passed through the aperture 10 and threaded into the socket 9 in the shutter casing 7 as illustrated in Figure 3. The core 13 of the cable extends into the shutter casing 7 and upon being actuated by pressure applied to the button 14, engages a lever inside the casing which snaps the shutter blades in known manner. The lever and blades being part of a conventional shutter mechanism are neither shown nor described in detail. The cable release is removed before moving the camera front and bed to closed position.

It will be apparent that the present arrangement not only is convenient from the operator's standpoint, but also offers certain structural advantages. Thus the cable release 12 is supported at two points rather than a single one. Because of the added supporting effect of the bed 5, it is impossible for the user to bend the cable release sharply at the point where it is joined to the socket 9. Such bending was common in connection with older types of release and often caused excessive wear or breakage at this point.

It is also quite customary to mount a photoflash synchronizing attachment on folding cameras of this type. Such synchronizers often include a flexible shutter release member or cable. Thus it is apparent that the synchronizing mechanism could be very conveniently and compactly attachable beneath the bed of the camera and with the shutter release passing through the bed as in the present invention.

Without further analysis the foregoing will so fully reveal the gist of my invention that others can by applying current knowledge readily adapt it for various applications without omitting certain features which, from the standpoint of the prior art, fairly constitute essential characteristics of the generic or specific aspects of this invention. Therefore, such adaptations should be and are intended to be comprehended within the meaning and range of equivalency of the following claims.

Now therefore I claim:

1. In combination with a folding camera, a device of the character described comprising a hinged platform having an aperture therein, a shutter casing housing a shutter operable within said casing, a threaded socket attached to the casing and a flexible cable extending through said aperture and threadedly engaging the socket for actuating said shutter.

2. In combination with a folding camera, a device of the character described comprising a hinged platform having an aperture therein, a hinged leg attached to the platform adjacent said aperture and operable as a closure therefor, a shutter casing housing a shutter operable within said casing, a threaded socket attached to the casing adjacent the hinged platform and a flexible cable extending through said aperture and threadedly engaging the socket for actuating said shutter, said aperture and socket being in alignment when said camera is in its unfolded position.

3. In combination, a folding camera of the self-erecting front type comprising a hinged platform provided with an aperture, and a lens, shutter and shutter casing movable to and from a picture-taking position above said bed when said bed is opened and closed, said shutter casing having a downwardly facing cable release socket disposed opposite said aperture when the camera is in open position, and a cable release member extending through said aperture and connected to said socket when said camera is in said picture-taking position.

4. In combination, a folding camera of the self-erecting front type comprising a hinged platform provided with an aperture and with a combination hinged bed supporting leg and aperture closing member, and a lens, shutter and shutter casing movable to and from a picture-taking position above said bed when said bed is opened and closed, said shutter casing having a downwardly facing cable release socket disposed opposite said aperture when the camera is in open position, and a cable release member extending through said aperture and connected to said socket when said camera is in said picture-taking position.

5. In combination, a folding camera of the self-erecting front type comprising a hinged platform provided with an aperture and with a combination hinged bed supporting leg and aperture closing member, and a lens, shutter and shutter casing movable to and from a picture-taking position above said bed when said bed is opened and closed, said shutter casing having a downwardly facing cable release socket disposed opposite said aperture when the camera is in open position.

EDWIN L. FISCHER.